(12) United States Patent
De Greef et al.

(10) Patent No.: US 10,067,335 B1
(45) Date of Patent: Sep. 4, 2018

(54) ELECTROWETTING ELEMENT WITH SHAPED COLOR FILTER

(71) Applicant: Amazon Technologies, Inc., Seattle, WA (US)

(72) Inventors: Petrus Maria De Greef, Waarle (NL); Erno Langendijk, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 14/980,587

(22) Filed: Dec. 28, 2015

(51) Int. Cl.
*G02B 26/00* (2006.01)

(52) U.S. Cl.
CPC .................. *G02B 26/005* (2013.01)

(58) Field of Classification Search
CPC ............... G02B 26/004; G02B 26/005; G02B 26/0841; G02B 26/02; G09G 3/348
USPC .... 359/290–292, 228, 245, 315, 665, 48, 84
See application file for complete search history.

(56) References Cited

U.S. PATENT DOCUMENTS

| | | | | |
|---|---|---|---|---|
| 2012/0162269 A1* | 6/2012 | Bohn | ................... | G02B 26/005 345/690 |
| 2014/0029080 A1* | 1/2014 | Hwang | ................ | G02B 26/005 359/290 |
| 2014/0133009 A1* | 5/2014 | Liu | ........................... | G03F 7/20 359/290 |
| 2014/0293397 A1* | 10/2014 | Novoselov | ........... | G02B 26/005 359/290 |

* cited by examiner

*Primary Examiner* — Stephone B Allen
*Assistant Examiner* — Rahman Abdur
(74) *Attorney, Agent, or Firm* — EIP US LLP

(57) ABSTRACT

An electrowetting element comprising a first fluid and a second fluid immiscible with the first fluid. A support plate comprises: a wall, a surface having a display area and an electrode. The wall bounds a perimeter of the display area which widens towards a first side of the electrowetting element. The electrowetting element further comprises a color filter substantially overlapping a first sub-area of the display area; and a substantially colorless region substantially overlapping a second sub-area of the display area and widening towards the first side of the electrowetting element.

13 Claims, 6 Drawing Sheets ized color filter. A predetermined hue is for example a
ELECTROWETTING ELEMENT WITH SHAPED COLOR FILTER

BACKGROUND

Luminance of a pixel can be controlled in dependence on a greyscale value. A greyscale value is used for example to indicate a greyscale level of a display effect output by a pixel, ranging from a minimum luminance level (black) to a maximum luminance level (white). Each greyscale level has a corresponding luminance value. In an electrowetting cell (for example a pixel or sub-pixel), the greyscale value corresponds for example with a magnitude of a voltage applied to the electrowetting cell and a corresponding configuration of first and second fluids in the cell. For example, for an 8 bit system, 256 greyscale values can be indicated, with 0 indicating a darkest (e.g. black) greyscale level and 255 indicating a lightest (e.g. white) greyscale level obtainable with the cell. In the electrowetting cell example, the 0 greyscale value corresponds with for example a zero voltage applied to the cell so the first fluid may form a layer configuration across a display area of the cell. In contrast, the 255 greyscale value corresponds with for example a non-zero voltage applied to the pixel so the first fluid is in a fully retracted configuration.

The human eye is more sensitive to gradual changes in luminance for darker greyscale levels than for lighter greyscale levels. Therefore, if a luminance value of a cell increases linearly in dependence on increasing greyscale value, this change of luminance is not perceived as a linear change of luminance by a human eye. Therefore, a so-called gamma correction may be applied to change the luminance of a given greyscale level output by a cell, to improve a luminance behavior of the cell, so that a function of luminance value against greyscale value of a cell more closely matches a luminance perception of the human eye. Such gamma correction may be performed by an electronic circuit or a processor modifying an input greyscale level value of a display effect encoded by input image data to an output signal for driving the cell to output a display effect with a gamma corrected greyscale level. Such gamma correction can increase a power demand of a display device.

It is desirable to improve the luminance behavior of an electrowetting element.

DETAILED DESCRIPTION

Examples are described below of an electrowetting element with a display area which widens towards a first side of the electrowetting element. For example, referring to FIG. 3, a color filter substantially overlaps a first sub-area of the display area and a substantially colorless region substantially overlaps a second sub-area of the display area. The substantially colorless region widens towards the first side of the electrowetting element too.

A first fluid such as a colored oil is retracted towards the first side of the electrowetting element, which for example can be considered to increasingly open an aperture as more of the display area is uncovered by the retracting first fluid. With the display area widening towards the first side of the electrowetting element, and as the first fluid is retracted, proportionally more light may be transmitted through the display area for a given distance of first fluid retraction. In combination with the widening of the substantially colorless region, a luminance change may increase for a given distance of first fluid retraction. The electrowetting element can be constructed such that a desired increase of luminance can be obtained for given input data values, for example greyscale values.

The display may for example have a substantially triangular shape and in some examples may have two substantially colorless regions, each widening towards the first side. With two such regions an even greater increase of luminance for a given distance of first fluid retraction may be obtained.

With such a construction, the electrowetting element may be constructed such that a luminance output for a given input data value is more appropriate for a sensitivity of a human eye to different luminance values. In this way a display effect emitted by the electrowetting element may be improved for human perception.

Figure 1:
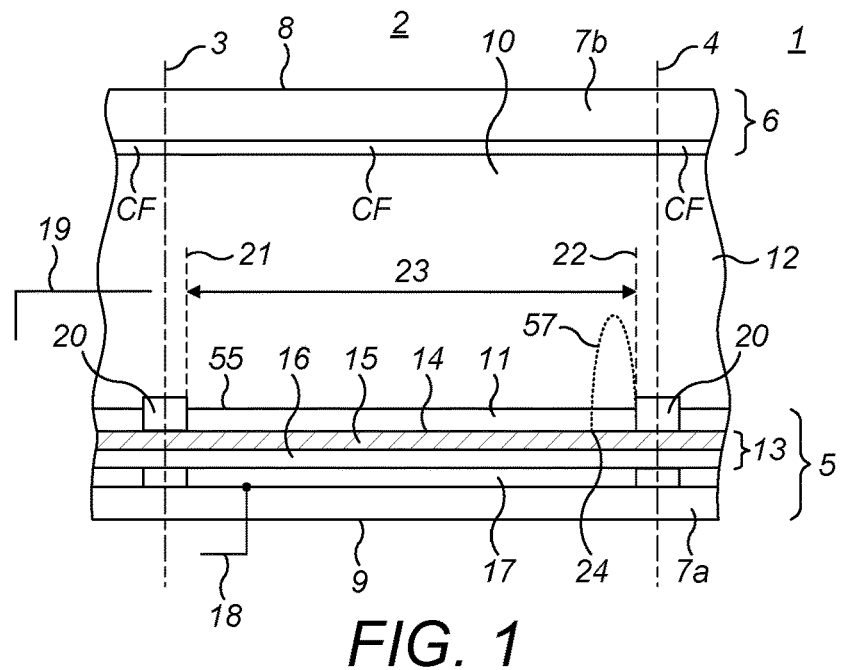
FIG. 1 shows schematically a cross-section of an example electrowetting element.
Figure 2:
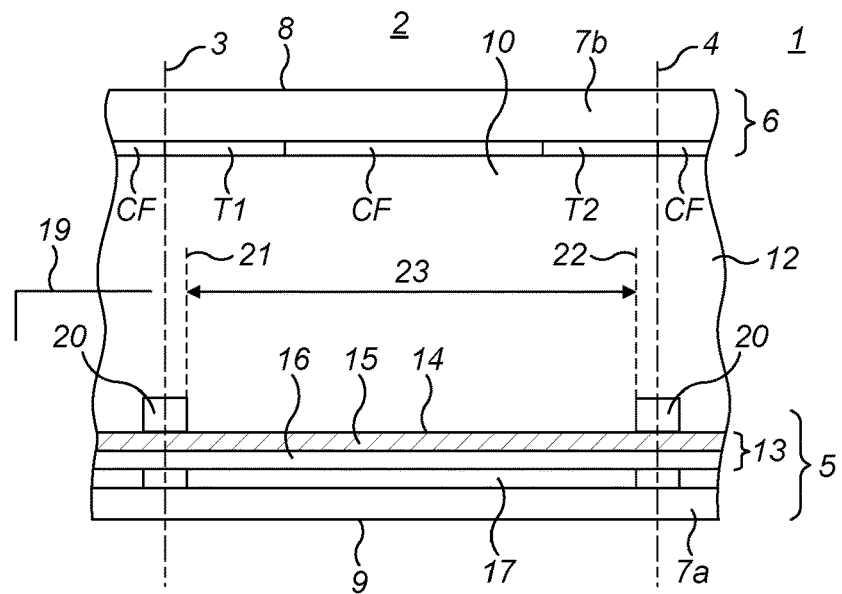
FIG. 2 shows schematically a different cross-section of the example electrowetting element.
Figure 3:
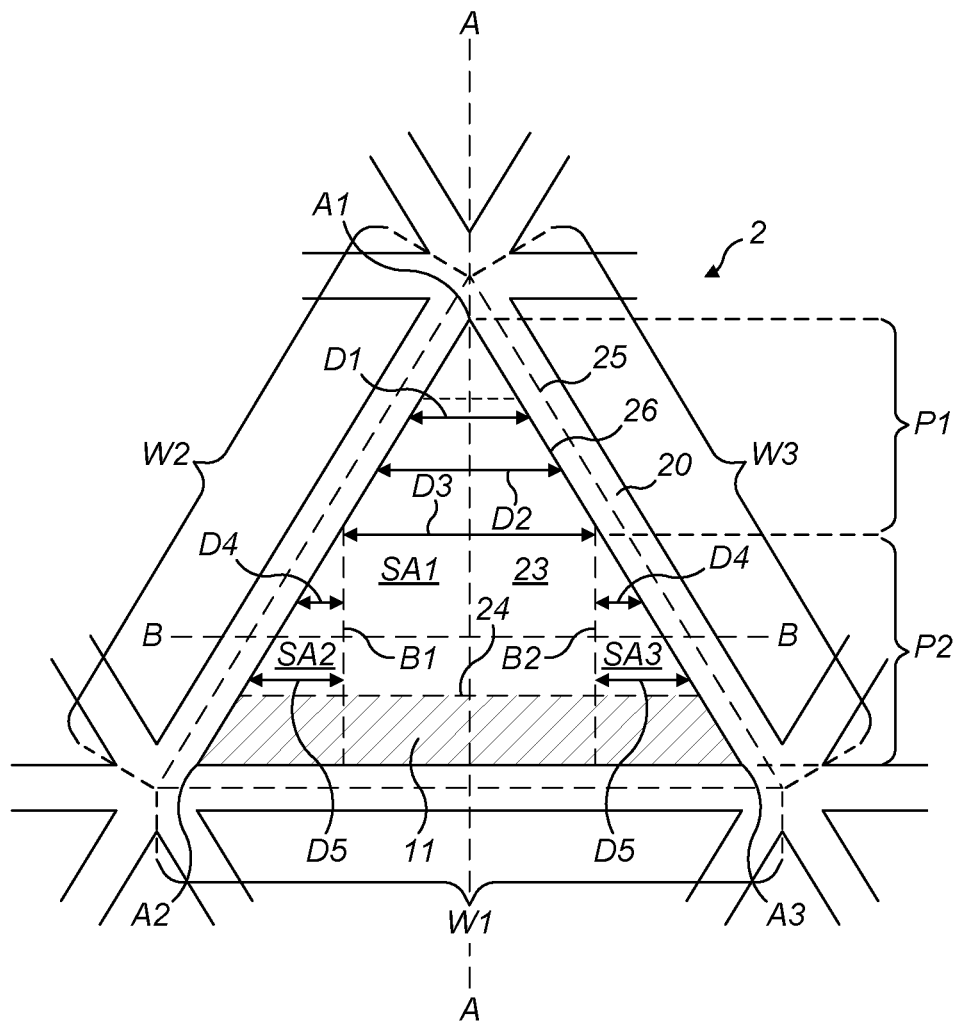
FIG. 3 shows schematically a plan view of the example electrowetting element.

FIG. 1 shows a diagrammatic cross-section of part of an example of an electrowetting device taken in a plane indicated in FIG. 3 by line A---A. FIG. 2 shows a diagrammatic cross-section of part of an example of an electrowetting device taken in a plane indicated in FIG. 3 by line B---B, perpendicular to line A---A. In this example the device is an electrowetting display device 1 including a plurality of electrowetting elements, which are respectively picture elements 2, otherwise referred to as display elements. One such electrowetting element is shown in FIG. 1. In examples, a plurality of electrowetting elements may form a pixel for providing a display effect, each electrowetting element of the plurality being a sub-pixel for providing a sub-pixel display effect, for example a red, green or blue color display effect. The lateral dimension of the picture element is indicated in the Figure by two dashed lines 3, 4. The electrowetting elements comprise a first support plate 5 and a second support plate 6. The support plates may be separate parts of each electrowetting element, but the support plates may be shared in common by the plurality of electrowetting elements. The support plates may each include a glass or polymer substrate 7a, 7b and may be rigid or flexible. The support plates in some examples include further layers and/or structures than illustrated, for example circuitry for controlling the electrowetting elements and connected for example to an electrode of each electrowetting element with a via for example. Such features are not illustrated, for clarity.

In examples to be described, the electrowetting element includes a color filter CF. The color filter transmits at least one wavelength of input light, for example light incident on the color filter, to output from the color filter CF light with a predetermined hue. A predetermined hue is for example a particular color which has been selected for the color filter to output. In other words light exiting the color filter has the predetermined hue. Thus, the color filter filters out, for example absorbs, or otherwise removes, input visible light for example with a wavelength different from the at least one wavelength transmitted by the color filter. In this way, a color filter for example selectively transmits, by selectively filtering, input light. So, a color filter may not absorb visible light with a wavelength corresponding to the predetermined hue. In examples the color filter is a non-switchable color filter; for example, the color filter has a fixed shape and therefore a spatial configuration of the non-switchable color filter is not changeable, for example is not switchable. Thus, the non-switchable color filter may be a non-fluid color filter. This may be contrasted with for example the first fluid described below, which may include a dye or pigment therefore to act as a color filter which is switchable between different first fluid configurations. As explained below, the color filter further contributes to a display effect provided by the electrowetting element, in addition to a configuration of the first and second fluids. In the example of FIG. 1 there is a planar layer, for example a color filter layer (in other words a layer including a color filter), and in this example is lying on a surface of the second support plate 7b, which surface is a surface of the second support plate nearest to the space described below. It is to be appreciated in further examples that the color filter layer may be located in a different position in the electrowetting element, for example on a surface of the second support plate furthest away from the space or as part of the first support plate, provided the color filter layer is located such that light passing through the element to provide a display effect passes through the color filter layer. Alternatively, in other examples, the color filter layer is located in the first support plate; where the electrowetting element operates in a reflective manner, the color filter layer is for example located in the first support plate between a reflector (such as a reflective electrode or a separate reflector in the first support plate) and the surface adjoined by at least one of the first or second fluids.

The color filter layer in examples has at least one first region, for example a first planar layer portion of the planar layer with the height of the planar layer, formed of a material functionable as the color filter and at least one second region, for example a second planar layer portion of the planar layer with the height of the planar layer, non-overlapping with and adjoining the at least one first region, the at least one second region formed of a material functionable as the substantially colorless region described herein. The first region at least partly comprises the color filter CF. The color filter filters at least one wavelength of light, for example in the visible spectrum, thus filtering the light passing through the color filter and transmitting light of at least one wavelength. The color filter may therefore comprise or be formed of a color filter material having a color filtering property. The second region at least partly comprises a substantially colorless region and is in this example a substantially colorless region T which is for example transmissive, for at least one wavelength of light which is filtered by the color filter and for example is transmissive for substantially all light incident on the second region, for example substantially all or 90% or more of wavelengths of light in the visible light spectrum. In other words, the substantially colorless region can be considered to be a transmissive region T configured to transmit light through the transmissive region without substantially outputting the predetermined hue which is output by the color filter, or indeed without acting as a color filter for substantially all or 90% or more of wavelengths of light in the visible light spectrum. The term substantially used here typically means for example there is a degree of tolerance in the amount of light transmitted by the second region. The substantially colorless region may not therefore transmit all light but may transmit enough light such that a performance of the electrowetting element is not impeded. For example, the second region may transmit 90%, 95% or greater of light incident on the second region. The second region may for example transmit three times greater, or more, light than the first region. The substantially colorless region may for example be formed of a suitable transmissive material or may be an opening, in other words an aperture or a hole or a space, in the color filter layer, through which light may pass. The substantially transmissive region may therefore be considered to output white light in some examples. Examples of a material for forming the color filter include a resist material such as the JSR OPTMER™ CR series. These are pigment dispersed photo-resists. Where the second region is formed of a material, an example material for forming the second region is selected from the JSR OPTMER SS series. These are heat-curable materials which can be used as protective overcoatings for a color filter region, but which can also be used to form the second region. They are mainly composed of acrylic polymers. The skilled person would readily understand how to form such a color filter layer with patterned first and second regions.

Further details of the color filter and the substantially colorless region will be described later.

The display device has a viewing side 8 on which an image or display formed by the display device can be viewed and a rear side 9. In FIG. 1 a surface of the first support plate 5, which surface is in this example a surface of the substrate 7a, forms the rear side 9; a surface of the second support plate 6, which surface is in this example a surface of the substrate 7b, forms the viewing side 8; alternatively, in other examples, a surface of the first support plate may form the viewing side. The display device may be of the reflective, transmissive or transflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

A space 10, which may otherwise be considered to be a chamber, of each electrowetting element between the support plates is filled with two fluids, which in this example are liquids. In the example of FIG. 1, the space 10 is filled with a first fluid 11 and a second fluid 12 which in the absence of an applied voltage each form a layer.

The second fluid is at least one of electrically conductive or polar and may be water or a salt solution such as a solution of potassium chloride in water. The second fluid may be transparent, but may instead be colored, white, absorbing or reflecting. Typically, an electrically conductive fluid is for example a fluid such as the second fluid which is capable of conducting electricity; for example an electrical current may flow through the second fluid due to the flow of ions through the second fluid. Typically, a polar fluid in examples is a fluid such as the second fluid which comprises at least one compound having a molecule with a net dipole; for example that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bonds between different atoms in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid is electrically non-conductive and may for instance be an alkane like hexadecane or may be an oil such as silicone oil.

The second fluid is immiscible with the first fluid. Therefore, the first fluid and the second fluid do not substantially mix with each other and in some examples do not mix with each other to any degree. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids at least partially meet, for example contact, each other at an interface labelled 55 in FIG. 1 for when no voltage is applied and labelled 57 for when a voltage is applied, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The first fluid absorbs at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorbing for substantially all parts of the optical spectrum, or reflecting. A reflective first fluid may reflect the entire visible spectrum, making the layer appear white, or part of it, making it have a color. In examples to be described below, the first fluid is black and therefore absorbs substantially all parts of the optical spectrum, for example in the visible light spectrum. Typically, in examples, the phrase substantially absorbs includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

The support plate 5 includes an insulating layer 13. The insulating layer may be transparent or reflective. The insulating layer 13 may extend between walls of an electrowetting element. To avoid short circuits between the second fluid 12 and electrodes arranged under the insulating layer, layers of the insulating layer may extend uninterrupted over a plurality of electrowetting elements 2, as shown in the Figure. The insulating layer has a surface 14 facing the space 10 of the electrowetting element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon®AF1600. The barrier layer 16 may have a thickness, taken in a direction perpendicular to the plane of the substrate, between 50 nanometers and 500 nanometers and may be made of an inorganic material like silicon oxide or silicon.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes an electrode 17 as part of the support plate 5. The electrode is associated with, for example overlaps, the surface of the support plate providing the display area. In examples shown there is one such electrode 17 per electrowetting element. The electrode 17 is separated from the fluids by the insulating layer 13; electrodes of neighboring electrowetting elements are separated by a non-conducting layer. For an electrowetting element having a reflective operation, rather than transmissive, the electrode in some examples is reflective.

In some examples, further layers may be arranged between the insulating layer 13 and the electrode 17. The electrode 17 can be of any desired shape or form. The electrode 17 of an electrowetting element is supplied with voltage signals by a signal line 18, schematically indicated in FIG. 1. A second signal line 19 is connected to an electrode that is in contact with the second fluid 12. This electrode may be common to all elements, e.g. when they are fluidly interconnected by and share the second fluid, uninterrupted by walls. The electrowetting element 2 can be controlled by a voltage V applied between the signal lines 18 and 19. The electrodes 17 on the substrate 7a are coupled to a display control apparatus. In a display device having the electrowetting elements arranged in a matrix form, the electrodes can be coupled to a matrix of control lines on the substrate 7a.

The first fluid 11 in this example is confined to one electrowetting element by at least one wall, in this example a wall of the first support plate that follows the cross-section of the electrowetting element. The cross-section of an electrowetting element may have any shape; when the electrowetting elements are arranged in a matrix form, the cross-section is usually square or rectangular, but in other examples different cross-sectional shapes are envisaged. In such examples it is envisaged that the cross-sectional shape of the electrowetting element, in combination with a chosen shape of a color filter described below, can be used to control the properties (such as luminance and saturation) of a display effect provided by an electrowetting element.

In examples described herein, the wall bounds a perimeter of the display area. Typically, a perimeter is for example a boundary, outer edge, delimitation, or outline. Thus, in examples, with the wall formed of a material deposited on the surface, an inner edge of the wall in contact with the surface is coincident with, in other words determines, the outer edge or perimeter of the display area of the electrowetting element.

Although the walls are shown as structures protruding from the insulating layer 13, they may instead be a surface layer of the support plate, or a treated part of the surface, that repels the first fluid, such as a hydrophilic or less hydrophobic layer. The walls may extend from the first to the second support plate but may instead extend partly from the first support plate to the second support plate as shown in FIG. 1. The dimension of the electrowetting element, indicated by the dashed lines 3 and 4, is defined by the center of the walls 20 for example. The area of the surface 14 between the walls of an electrowetting element, indicated by the dashed lines 21 and 22, is called the display area 23, over which a display effect occurs and having a part which is adjoined by the first fluid. The display effect depends on a size of area, for example a surface area, that the first and second fluids adjoin the surface defined by the display area, in dependence on the magnitude of the applied voltage V described above. In other words the size of the part of the display area adjoined by the first fluid changes in dependence on the magnitude of the applied voltage. The magnitude of the applied voltage V therefore determines the configuration of the first and second fluids within the electrowetting element and is used to control the fluid configuration. When switching the electrowetting element from one fluid configuration to a different fluid configuration the size of area of second fluid adjoining the display area surface may increase or decrease, with the size of area of first fluid adjoining the display area surface decreasing or increasing, respectively. Thus, for a plurality of fluid configurations, the size of area that the respective first and second fluids adjoin the display area surface may be different for different of the plurality of configurations.

In the absence of an applied voltage, for example when the electrowetting element is in an off state, the first fluid 11 forms a layer between the walls 20, as shown in the FIG. 1. This may be considered to be a first configuration of the first and second fluids with a zero voltage applied between the electrode in the first support plate and the second fluid. Application of a voltage will retract the first fluid (for example due to attraction of the second fluid to the surface 14) for example against a wall as shown by the dashed shape 57 in FIG. 1, which illustrates a substantially fully retracted configuration of the first fluid. A substantially fully retracted configuration of the first fluid is for example where an applied voltage is the maximum applied voltage that the control system is configured to output. In other words, the substantially fully retracted configuration is the extreme on state of the electrowetting element, for example corresponding to a brightest display effect. The substantially fully retracted state may not be the maximum retracted first fluid configuration; for example, a greater voltage may be applied to retract the first fluid further, but the control system is not configured to provide that applied voltage. With a non-zero voltage applied between the electrode of the first support plate and the second fluid the first and second fluids may be considered to have a second configuration; this second configuration in some examples may be the substantially fully retracted configuration of the first fluid, but in other examples may be a less retracted configuration of the first fluid whilst still applying a non-zero voltage.

The controllable shape of the first fluid, in dependence on the magnitude of applied voltage, is used to operate the electrowetting element as a light valve, providing a display effect over the display area 23. For example, switching the fluids to increase adjoinment of the second fluid with the display area surface may increase the brightness of the display effect provided by the element.

FIG. 3 shows a matrix of electrowetting elements in a plan view of the hydrophobic layer of the first support plate. The dimension of the central electrowetting element in FIG. 3, corresponding to the dashed lines 3 and 4 in FIGS. 1 and 2, is indicated by the dashed line 25. Line 26 indicates the inner border of a wall; the line is also the edge, for example a perimeter, of the display area 23.

In examples described herein, the display area widens towards a first side of the electrowetting element. The first side of the electrowetting element may therefore be a widest side of the electrowetting element. As will be understood from the above, with the wall bounding the perimeter of the display area, an orientation of opposing wall portions of the wall may diverge towards the first side of the electrowetting element, with perimeter portions of the perimeter diverging correspondingly, with the display area widening accordingly. Typically, a widening is for example an increase in a width, in these examples of the display area, the display area lying in a two dimensional plane. A display area with such a widening may in examples be considered to have a tapered portion, with a wider portion and a narrower portion, the wider portion being nearer the first side of the electrowetting element and therefore a first edge of the display area adjacent to the first side of the electrowetting element. Therefore, the display area may narrow in a direction away from the first side of the electrowetting element.

Various shapes of the display area are envisaged in different examples. Any display area shape which widens is envisaged and therefore any corresponding wall configuration. Further, any shape of an electrowetting element is envisaged which accommodates such a widening display area. Usually, with a wall having a uniform thickness between adjacent electrowetting elements, the shape of the electrowetting element when taken in plan view will correspond with the shape of the display area, though in other examples the shape of the electrowetting element may differ from the display area shape if for example the thickness of the wall changes along its length.

In examples described herein, for example that of FIGS. 1, 2, 3 and 4, the display area is substantially triangular. Therefore, typically, the display area has three sides or edges, each side meeting a different side at a respective apex of the triangle. The examples illustrated in the FIGS. have an equilateral triangle shaped display area, though in other examples a different shape of triangle is envisaged, for example an isosceles, a right angled, a scalene or an obtuse triangle. By substantially triangular it is understood that in some examples the display area may not be perfectly triangular. For example, due to manufacturing techniques, edges of the triangle may not be perfectly straight or apexes may not be perfectly pointed; there may be some irregularities, but which do not detract from the intended functionality of the electrowetting element. In some examples, an apex may be flattened, in effect forming a further side of the triangle joining two sides of the triangle which would otherwise meet to form an apex; such examples are considered to be substantially triangular.

In the example of FIG. 3, the wall comprises a first wall portion W1, a second wall portion W2 and a third wall portion W3 which together form a substantially triangular shaped wall in plan view and form a substantially triangular display area. The first wall portion W1 joins the second wall portion W2 and the third wall portion W3, the second wall portion W2 joins the first wall portion W1 and the third wall portion W3, and the third wall portion W3 joins the first wall portion W1 and the second wall portion W2. The first wall portion is located at the first side of the electrowetting element, towards which the display area widens; therefore, an orientation or longitudinal axis of each of the second and third wall portions diverge towards the first wall portion so that the display area widens. The first wall portion W1 therefore in these examples forms the first side of the electrowetting element. It is noted that where the electrowetting element is one of a plurality of electrowetting elements forming an array, a portion of the wall of one electrowetting element is also a portion of a wall of an adjacent electrowetting element. In other words a wall portion may be common to two or more adjacent electrowetting elements, depending on the shape of the electrowetting elements and/or any tessellation pattern of adjacent electrowetting elements.

In examples such as that of FIG. 3, the substantially triangular display area has three apexes A1, A2 and A3 formed respectively where the second and third wall portions meet, where the first and second wall portions meet, and where the first and third wall portions meet.

In examples described herein, for example that of FIGS. 1, 2 and 3, an extent of the color filter CF in a plane parallel to a plane of the surface, for example the display area, is smaller, for example less, than the display area. The phrase plane parallel to a plane used herein includes the possibility that the plane is for example substantially parallel to the plane, to account for example for manufacturing tolerances. The color filter substantially overlaps, for example at least overlaps, lies over or covers, a first sub-area SA1 of the display area. Part of the color filter may overlap part of the wall too. The extent of the color filter is the extent, for example an area, of the color filter which overlaps with, for example lies over, the display area and through which light may pass for contributing towards a display effect. In examples described herein, with the color filter having a smaller extent than the display area, a proportion of light passing or having passed through the display area may not pass through the color filter and may instead pass through at least one substantially colorless region.

The electrowetting element in examples comprises at least one substantially colorless region T such as that described earlier which substantially overlaps, for example overlaps, lies over or covers, a second sub-area of the display area which does not overlap the first sub-area and which widens towards the first side of the electrowetting element. With such widening, a width of an area of the substantially colorless region, for example in a plane parallel the plane of the display area, increases in a direction towards the first side of the electrowetting element. Therefore, opposing portions of a perimeter of the substantially colorless region, and therefore corresponding portions of a perimeter of the second sub-area of the display area diverge towards the first side of the electrowetting element. Similarly, an extent of each such substantially colorless region, taken in the plane parallel to a plane of the display area, is smaller than the display area. The substantially colorless region may overlap a portion of the wall too.

In examples such as those of FIG. 3, the electrowetting element comprises two such substantially colorless regions: a first substantially colorless region T1 (see for example in FIG. 2) substantially overlapping a second sub-area SA2 of the display area and a second substantially colorless region T2 (see for example in FIG. 2) substantially overlapping a third sub-area SA3 of the display area, both of which widen towards the first side of the electrowetting element. The second and third sub-areas are shown in FIG. 3 and in this and other examples, the first, second and third sub-areas do not overlap each other. Therefore, the sum of the first, second and third sub-areas in examples equals the display area.

The configuration of the color filter and the substantially colorless region will now be described in more detail. This will be done in the context of FIG. 3, but it is to be appreciated that the description applies to other examples as the skilled person will understand.

The color filter CF has a shape which at least partly widens towards the first side of the electrowetting element. Therefore, in a plane substantially parallel to the plane of the display area, an area of the color filter CF increases in width in a direction towards the first side of the electrowetting element. The increase in width may be a linear increase, for example if at least one edge of the color filter CF is straight and diverges from an opposing straight edge of the color filter CF. In other examples the linear edge may instead be curved or another shape which causes the area of the color filter CF to increase in width.

In some examples, the color filter CF may continue increasing across its area. For example, the color filter CF may have a V-shaped outline or another shaped outline with an increasing width across its area. In other examples, such as those described in relation to FIG. 3, a first color filter portion of the color filter CF widens towards the first side of the electrowetting element and a second color filter portion of the color filter CF, adjoining the first color filter portion, doesn't widen towards the first side of the electrowetting element; for example the second color filter portion has a substantially uniform width as in the examples described using FIG. 3, or in other examples may narrow towards the first side of the electrowetting element.

In examples such as that of FIG. 3, the color filter CF has a shape which overlaps the first sub-area SA1 The electrowetting element in such examples also comprises a first substantially colorless region T1 which overlaps the second sub-area SA2 and the second substantially colorless region T2 which overlaps the third sub-area SA3. In such examples the first sub-area is located between the second sub-area and the third sub-area and adjoins the second sub-area and the third sub-area by a first boundary B1 and a second boundary B2 respectively. The color filter CF comprises a first color filter portion P1 which widens towards the first side of the electrowetting element. The first color filter portion P1 and therefore the first sub-area has a first width D1 and a second width D2 greater than the first width D1, the first width D1 being taken at a greater distance from the first side of the electrowetting element than the second width D2, the first and second widths D1, D2 taken in this example in a direction parallel the first side of the electrowetting element. The color filter CF further comprises a second color filter portion P2, nearer to the first side of the electrowetting element than the first color filter portion P1, which has a substantially uniform width D3, taken in this example in a direction parallel the first side of the electrowetting element. Therefore, a width of the second color filter portion P2 may be constant from where the first color filter portion meets the second color filter portion to the edge of the color filter at the first side of the electrowetting element. Indeed, in these examples, the extent of the color filter CF extends from overlapping the first apex A1 to the first side of the electrowetting element which opposes the first apex in these examples. Edges of the second color filter portion may be parallel to each other, in a direction extending perpendicularly from the first side of the electrowetting element; in other examples, at least one side of the second filter portion may differently orientated. The first sub-area comprises a first apex area of the display area, overlapping the first color filter portion, and which extends from the first apex A1.

In examples such as that of FIG. 3, the first substantially colorless region T1 (see for example in FIG. 2) and the second substantially colorless region T2 (see for example in FIG. 2) have a shape which overlaps the second and third sub-areas SA2, SA3, respectively. In examples now to be described, the second and third sub-areas are located adjacent to the part of the first sub-area overlapped by the second color filter portion P2. In these examples, the color filter and the first and second substantially colorless regions may be shaped and located in the electrowetting element so as to form a symmetrical pattern of the color filter and substantially colorless regions along a plane of symmetry extending in the examples of FIG. 3 perpendicularly from the first side of the electrowetting element to the first apex A1. In FIG. 3 such a plane of symmetry is for example coincident with the cross-sectional plane indicated by dashed line A---A. Thus, in examples, the second sub-area extends from the second apex A2 along the first and second wall portions W1, W2 until meeting the first sub-area at the second boundary B1, thus forming a second apex area of the display area. Similarly, the third sub-area extends from the third apex A3 along the first and third wall portions W1, W3 until meeting the first sub-area at second boundary B2, thus forming a second apex area of the display area. Thus, in examples, the first sub-area separates the second sub-area and the third sub-area of the display area. Such a separation positions the second and third sub-areas on either side of the first sub-area, and therefore corresponds with the color filter separating the first and second substantially colorless regions, which causes an output display effect to be determined in a balanced manner, for example with incident light being color filtered by the color filter and luminance controlled by the substantially colorless regions in a symmetrical manner due to the symmetry of the color filter and substantially colorless regions described above.

In examples the substantially colorless region, for example the first and second substantially colorless regions T1, T2 (see for example in FIG. 2) of FIG. 3 and other examples, has a triangular or substantially triangular shape which widens towards the first side of the electrowetting element. Therefore, as illustrated in FIG. 3, each of the first and second substantially colorless regions has a fourth width D4 and a fifth width D5 greater than the fourth width D4, the fourth width D4 being taken at a greater distance from the first side of the electrowetting element than the fifth width D5, the fourth and fifth widths taken in a direction parallel the first side of the electrowetting element.

FIG. 3 illustrates the position within the display area of an interface 24 between the first fluid, the second fluid and the surface 14 of the first support plate with the first fluid illustrated in the substantially fully retracted configuration, which is an example of the second configuration referred to above. The interface is an edge of a meniscus between the first and second fluids. In at least one configuration of the first and second fluids, such as the first configuration with the zero applied voltage, the edge of the meniscus may not contact the display area. Whereas with the first fluid at least partially retracted, the edge of the meniscus may contact the display area along the line illustrated by label 24. It is to be appreciated that typically a meniscus is represented by a line between different materials which do not mix; in other words a meniscus represents an interface between those materials. The interface 24 may be considered to be a three phase line between the first fluid, the second fluid and the display area.

It is noted that a configuration of the first and second fluids may not be shaped as illustrated in the FIGS. but may in reality have some degree of irregularity not shown. For example, an edge of the interface between the first and second fluids described above and which adjoins the display area may not be straight but may instead be irregular to some extent in form. Further, movement of the first and second fluids during switching of the fluid configuration may be irregular rather than perfectly following an axis of motion for example in a direction perpendicular or substantially perpendicular the axis of motion, which axis is for example perpendicular to the first side of the electrowetting element. This irregularity is for example due to the fluid nature of the first and second fluids as will be appreciated by the skilled person.

As explained above, depending on a magnitude of a voltage applied between the second fluid and the electrode of the electrowetting element, a configuration of the first and second fluids is switchable. Thus, for example if the first fluid is black and acts as an optical shutter depending on the extent of retraction from the display area, and the extent of the color filter and the substantially colorless region (such as the first and second substantially colorless regions) overlapped by the first fluid, a color, for example a hue, and a luminance of a display effect output by the electrowetting element may be controlled.

In examples, the electrowetting element is configured to retract the first fluid towards the first side of the electrowetting element during switching from the first configuration of the first and second fluids to the second configuration of the first and second fluids. Thus, when changing the applied voltage from a zero applied voltage to a non-zero applied voltage the first fluid retracts towards the first side of the electrowetting element, for example away from the first apex. As the skilled person will appreciate, the motion of fluids in an electrowetting element may be influenced using numerous different techniques. For example, a direction of fluid motion may be influenced by constructing the electrowetting element or applying a voltage in a manner which determines where initiation of fluid motion occurs and/or where fluid tends to collect on the display area as a consequence of retracting. An example of the former is for example using a material with a different wettability to the second fluid, to determine a location where fluid motion initiates; an example is now described more specifically. An example of the latter is for example using an electrode in the first support plate which does not fully overlap the display area; a portion of the display area therefore doesn't overlap the electrode which can form a collection area on the display area where no or a reduced electric field is applied compared with other parts of the display area overlapping the electrode.

By retracting the first fluid towards the first side of the electrowetting element, the overlap by the first fluid of the substantially colorless region, for example of the first and second substantially colorless regions T1, T2, decreases as the interface 24 moves across the display area towards the first side of the electrowetting element, therefore exposing a greater area of the substantially colorless region(s) and allowing more light to pass out of the electrowetting element through the substantially colorless region(s). This means that a luminance of an output display effect increases at a greater rate than a rate of increasing a greyscale value. This will be explained in further detail below.

In examples, for example that illustrated using FIG. 3, the display area comprises an initiation area spaced from the first side of the electrowetting element. The electrowetting element is configured to initiate movement of the first fluid, for example when retracting, from the initiation area towards the first side of the electrowetting element upon switching from the first configuration to the second configuration of the first and second fluids. Thus, a direction of motion of the first fluid when applying a non-zero voltage may be determined and therefore a movement of the first fluid when retracting.

In some examples, for example that of FIG. 3, the display area comprises an initiation area. The surface of the first support plate within the display area but outside the initiation area may comprise, for example be formed of, a first material such as a material less wettable to the second fluid than a second material with a zero voltage applied between the electrowetting element electrode and the second fluid, which first material is for example hydrophobic as explained above. Within the initiation area the surface may comprise the second material which is more wettable to the second fluid than the first material with the zero voltage being applied. The second material may be for example a layer of second material deposited on a surface of the first material, or in other examples may be a part of the first material which has been treated to change the wettability properties relative to those of the first material.

In further examples, in addition to, or alternatively to using first and second materials of different wettabilities (or the part of the first material having been treated to change its wettability), the electrowetting element may be configured to provide the initiation of first fluid movement at the initiation area using a shaping of the underlying electrode (e.g. with a part of the electrode corresponding to (e.g. overlapping) the initiation area being closer to the second fluid in the off state, relative to other parts of the electrode not corresponding to the initiation area) and/or a change in thickness of at least one layer of the insulating layer and/or the first fluid layer with the electrowetting element being in an off state (e.g. with the first fluid layer thickness in the off state being thinner in correspondence with (e.g. overlapping) the initiation area than the first fluid layer thickness corresponding with other parts of the display area not corresponding to the initiation area).

In examples, such as those described using FIG. 3, an initiation area such as described above may be located at the first apex A1 of the substantially triangular display area, the first apex A1 being between the second wall portion and the third wall portion. The initiation area extends from the apex into the display area by an extent required to give the required initiation effect on fluid motion.

With appropriate control of the first and second fluid configuration, using an appropriate magnitude of the applied voltage, an output display effect is provided by the electrowetting element with a proportion of light having been transmitted by the color filter and in some fluid configurations a proportion of light having passed through the substantially colorless region(s) of the electrowetting element. Thus, an output display effect depends on a saturation of a predetermined hue of light and a luminance value, determined by the color filter and the substantially colorless region(s) accordingly.

This will now be explained further with reference to FIGS. 4A to 4D. Each of these FIGS. shows the electrowetting element of FIG. 3, in plan view and schematically. Corresponding reference labels are used to indicate certain features. It is to be appreciated that the principles explained now apply to other envisaged examples, for example with one substantially colorless region.

Figure 4A:
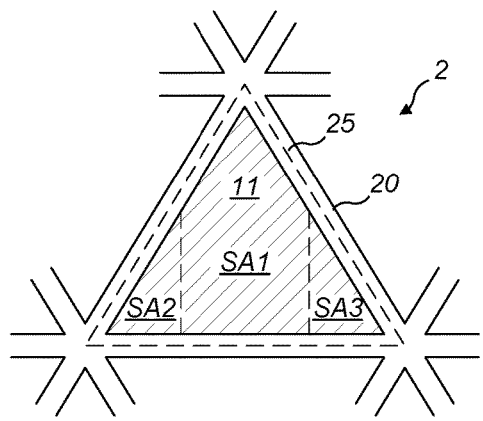
FIGS. 4A to 4D show schematically plan views of different fluid configurations for the example electrowetting element.

In FIG. 4A the first and second fluids have the first configuration with a zero voltage applied. Therefore, the first fluid forms a layer across the display area 11. It is to be noted that an initiation area which may be present in some examples is not indicated here for clarity. With the first and second fluids in the first configuration, and the first fluid for example being black and therefore absorbing substantially all visible light for example, the first fluid blocks light passing through the display area and therefore through the color filter CF and the substantially colorless regions T1, T2,(see for example in FIG. 2) by overlapping the color filter and the first and second substantially colorless regions T1, T2 (see for example n FIG. 2). Thus, the display effect output by the electrowetting element is the darkest display effect, with for example a black luminance and corresponding with the 0 greyscale value.

Figure 4B:
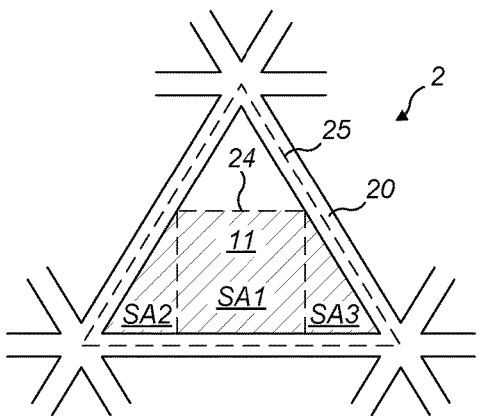

In FIG. 4B, a different configuration of the first and second fluids is illustrated, with a non-zero voltage applied with a magnitude corresponding to the extent of first fluid retraction indicated by the position of the interface 24 shown in FIG. 4B. In this configuration the first fluid is retracted so as to allow light to pass through the first color filter portion of the color filter, by not overlapping the first color filter portion, and not to allow light to pass through the second color filter portion and not through either of the substantially colorless regions T1, T2, by overlapping the second color filter portion and the first and second substantially colorless regions T1, T2. Thus, a display effect with a relatively high color saturation and relatively dark luminance is output.

Figure 4C:
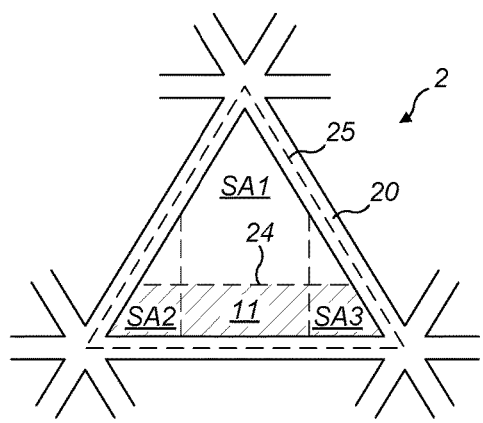

In FIG. 4C, a yet further different configuration of the first and second fluids is illustrated, with a non-zero voltage applied with a greater magnitude than for the FIG. 4B example and corresponding to the extent of first fluid retraction indicated by the position of the interface 24 shown in FIG. 4C. In this configuration the first fluid is retracted more fully than in FIG. 4B and allows light to pass through the first color filter portion, approximately half of the second color filter portion and approximately half of the first and second substantially colorless regions T1, T2, by overlapping approximately half of the second color filter portion and the first and second substantially colorless regions T1, T2.

Figure 4D:
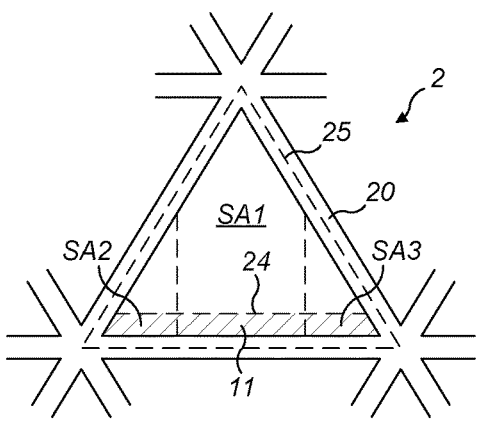

In FIG. 4D, a substantially fully retracted first fluid configuration is illustrated, with a non-zero voltage applied with a greater magnitude than for the FIG. 4C example and corresponding to the extent of first fluid retraction indicated by the position of the interface 24 shown in FIG. 4D. In this configuration, light may pass through the first color filter portion, and the majority of the second color filter portion and the majority of the first and second substantially colorless regions T1, T2 (see for example in FIG. 2). The display effect output for this configuration is the lightest, in other words highest luminance, display effect, for example with a white luminance, that cab be output by the electrowetting element and corresponds for example to the 255 greyscale value.

As will be appreciated from the examples of FIGS. 4A to 4D, as the first fluid is retracted from the configuration of FIG. 4A to the configuration of 4D, stepwise by single greyscale values, the size of area of part of the display area not adjoined by the first fluid, and therefore adjoined by the second fluid, increases non-linearly, due to the widening of the display area towards the first side of the electrowetting element. Therefore, as the greyscale value increases stepwise or incrementally bit by bit, the luminance increases non-linearly, as increasingly more light can pass through the display area and on through the color filter and in some configurations through the first and second substantially colorless regions. When the first fluid is retracted to the extent that the first fluid overlaps only part of the substantially colorless regions, the luminance of a display effect increases even more non-linearly, due to the increasing width of the substantially colorless regions towards the first side of the electrowetting element, and the substantially uniform width of the color filter meaning no additional color filtering occurs once the first fluid is retracted so as no longer overlapping the first color filter portion. Therefore, with further retraction of the first fluid, with no such additional color filtering, the luminance increases even more non-linearly, thus for example getting closer to a desired electro optical transmission of the electrowetting element.

The effect of the widening of the display area towards the first side of the electrowetting area and also the widening of the substantially colorless region (and in further examples of more than one substantially colorless region, for example the first and second substantially colorless regions T1, T2 above) towards the first side of the electrowetting element are now explained in further detail with reference to FIGS. 5a, 5b and 5c.

Figure 5C:
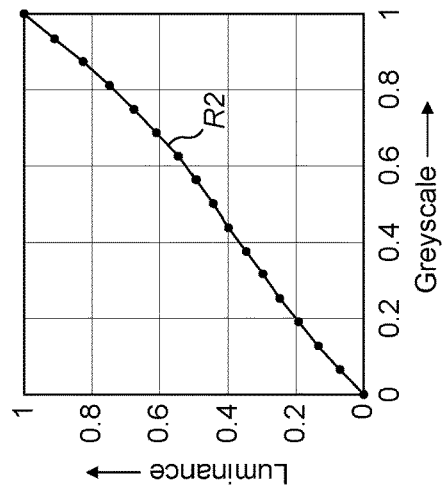
FIGS. 5a, 5b and 5c show plots of luminance against greyscale.
Figure 5B:
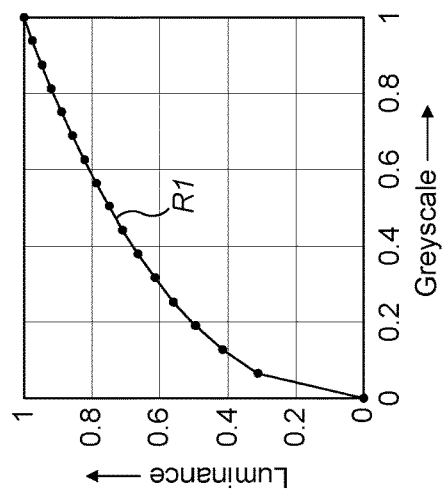
Figure 5A:
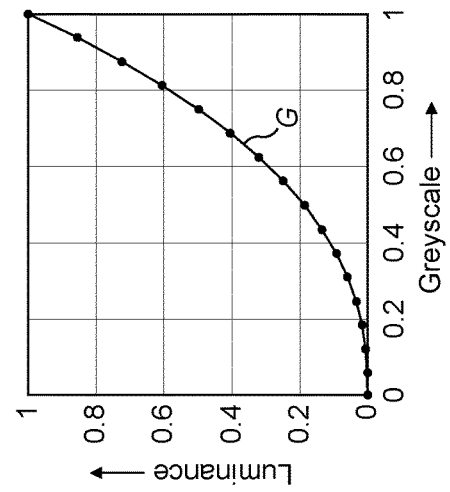

FIGS. 5a, 5b and 5c illustrate a plot of a function of luminance against greyscale value. The luminance axis extends from a value of 0, corresponding to a black luminance, to 1, corresponding to a white luminance. In other words, a black luminance is the least luminant greyscale level and a white luminance is the most luminant greyscale level. Luminance may be considered to be a measure of a quantity of light. Luminance may alternatively be referred to for example as a lightness or brightness. It is noted that the term greyscale level is typically used in association with a level of luminance of a display effect, corresponding with a greyscale value (and therefore with a given magnitude of an applied voltage), and therefore does not necessarily apply only to display effects of a shade of grey. For example, if an electrowetting element has a color filter for outputting red light, then a greyscale in this context refers for example to a luminance value for a given display effect of the red hue outputted by the color filter. In other words, the electrowetting element may output a red display effect with a luminance value ranging from 0 to 1.

A greyscale value is typically a value corresponding with a certain magnitude of a voltage to be applied to the electrowetting element for driving the first and second fluids to a particular configuration. For example, in an 8 bit system, the greyscale value may range from 0 to 255, with 0 corresponding to the darkest display effect to 255 corresponding to the lightest display effect. A greyscale value is coded for example by input image data received by a processor which is then processed to ultimately output a voltage, for example by a driver component, for applying to the electrode of the electrowetting element and the second fluid for driving the first and second fluids to a given configuration. A greyscale value may otherwise for example be referred to as a video value or an image value.

FIG. 5a illustrates a plot labelled G. This represents a function of luminance of a display effect against a value (in this example a greyscale value) corresponding to input data for a given display effect. The shape of the function G corresponds to the perception of the human eye of a non-linear change of luminance for a stepwise increase in greyscale value which would code for a linear increase in luminance.

FIG. 5b shows a second plot labelled R1 which represents an output luminance function for the display effects output by a known electrowetting element with, for example, a rectangular display area, plotted against the greyscale value. It can be seen that this plot R1 differs significantly from the plot G, meaning the luminance behavior of such a known electrowetting element is notably different from a desired luminance behavior which more closely matches plot G.

FIG. 5c shows a third plot labelled R1 which represents an output luminance function for the display effects output by an electrowetting element of examples described herein, for example that of FIG. 3, plotted against the greyscale value. The plot R2 may therefore be considered to represent an output luminance function. In this example the plot R2 represents the luminance of display effects for a reflective electrowetting element. This luminance may therefore otherwise be referred to as a reflectance. The plot may in other examples represent a luminance of display effects for a transmissive electrowetting element; this luminance may otherwise be referred to as a transmission.

As FIG. 5c shows, compared with the plot R1, the plot R2 better approximates the plot G. Due to using a widening display area and widening substantially colorless region(s) as described above, the plot R2 more closely approximates the plot G and therefore a desired electro optical output of the electrowetting element than the plot R1, without any input image data processing to add a gamma correction.

This closer approximation of the plot G can be understood by reference to the widening of the display area and of the substantially colorless region(s). For example, by retracting the first fluid towards the first side of the electrowetting element with increasing applied voltage magnitude (and therefore with increasing greyscale value), for a given increase in greyscale value, an non-proportional increase in luminance occurs, which is greater than a luminance increase which would occur if the luminance/greyscale value relationship was linear. To start with, when retracting the first fluid from the configuration of FIG. 4A, the luminance increases due to the widening of the first color filter portion. However, as color filtering removes some of the incident light, the increase in luminance is not as great as when the first fluid is sufficiently retracted to allow light to pass also through the substantially colorless regions. Therefore, together with light then passing through the substantially colorless regions, the widening of the substantially colorless regions causes an over proportional increase in luminance to occur as the first fluid is retracted further towards the configuration of FIG. 4D (and therefore as the greyscale value increases towards 255 for example). This change in luminance is represented by the plot R2, with an increasing gradient, which gradient notably increases when the first fluid is sufficiently retracted to allow light to pass through the substantially colorless regions.

In examples with the widening of the display area towards the first side of the electrowetting element, combined with the widening of the substantially colorless region, for example the first and second substantially colorless regions with a triangular display area and a widening first color filter portion, the electrowetting element may be constructed to increase luminance according to a squared function (which may be notated x2) for darker luminance greyscale levels with light passing through the color filter but not through the substantially colorless regions. Then, with the first fluid retracted further so light can pass through the substantially colorless regions, the presence of the substantially colorless regions in combination with the widening of the substantially colorless regions can cause luminance to increase according to a power of 4 function (which may be notated x4), which corresponds to the steeper gradient of plot R2 in FIG. 5c.

In this way, the electrowetting element may be constructed such that output luminance across the greyscale value range may more closely approximate the plot G.

With appropriate tuning, for example of any of: the shape of the color filter, the shape of the substantially colorless region, an area of the color filter, an area of the substantially colorless region, a concentration of a color filtering material of the color filter, or a thickness of the color filter, an output luminance function of the electrowetting element may more closely approximate the plot G. Any of these properties may be different for example for different sub-pixels; for example, an area of a color filter may differ for different sub-pixels of different colors.

In this way, an electrowetting element according to examples described herein may be optimized for at least one of gamma, contrast, brightness, color saturation, a desired color gamut, without necessarily using data processing and modification techniques for adding gamma correction before outputting a voltage for applying to the electrowetting element, which techniques may be complex and increase power demands. In some examples though, such gamma correction techniques may be used to further improve approximation of the plot G. Further, using an array of electrowetting elements as will be described below, the horizontal and vertical resolution may also be optimized. It is noted too that in yet further examples, the optimization of one electrowetting element with a color filter of a particular color may be different for a different electrowetting element with a color filter of a different color.

Figure 6:
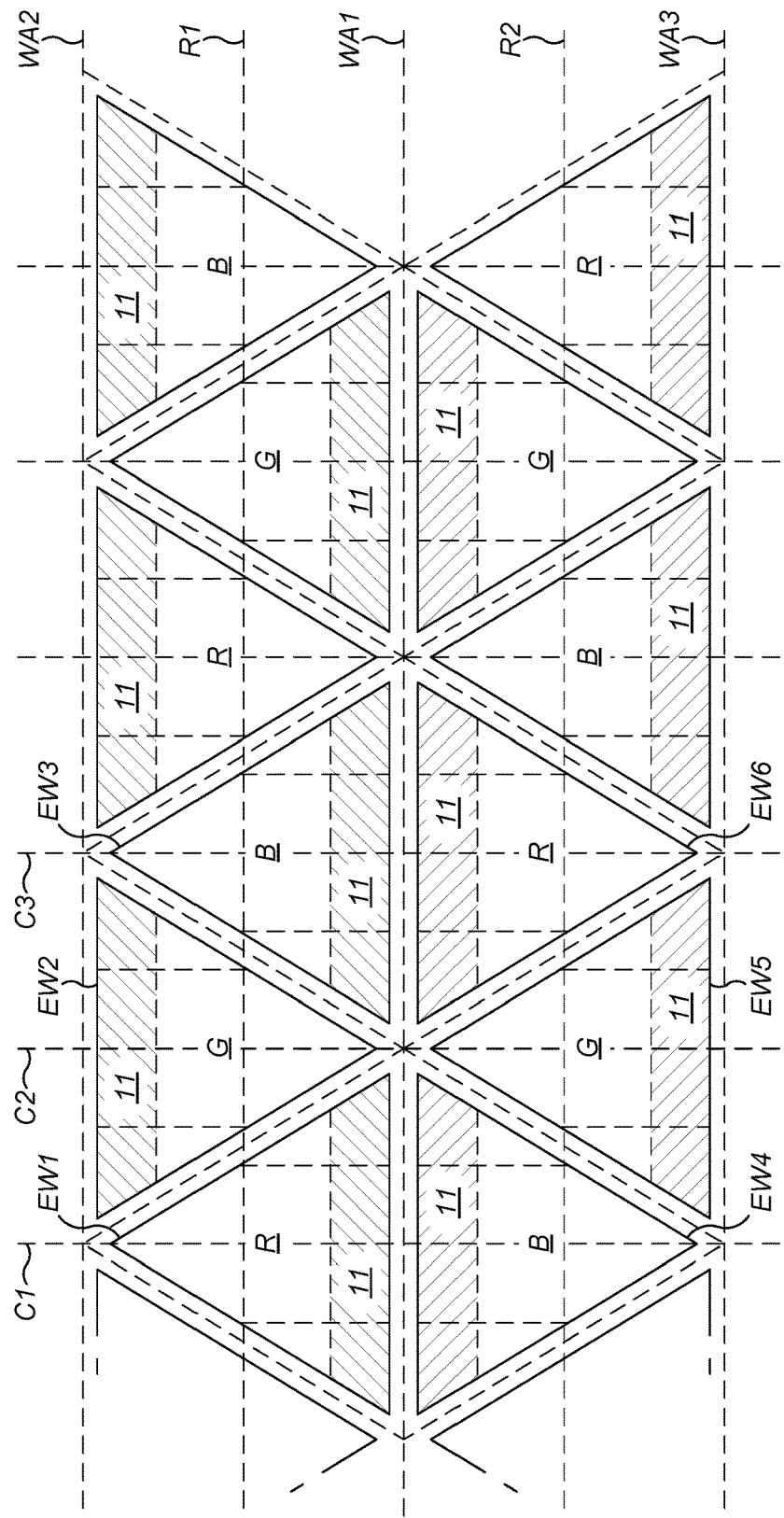
FIG. 6 shows schematically a plurality of electrowetting elements according to an example.

FIG. 6 shows schematically a plurality of electrowetting elements of an array of electrowetting elements, for example of an electrowetting display device, each electrowetting element being for example in accordance with FIG. 3. In the example of FIG. 6, with the substantially triangular display areas and substantially triangular wall of each respective electrowetting element as shown, the electrowetting elements are tessellated to form a tessellated array of the electrowetting elements. A first row of the electrowetting elements is located on a first row axis R1 of the array and comprises a first, second and third electrowetting element EW1, EW2, EW3 respectively. The second electrowetting element EW2 is located between and adjacent to (for example adjoining) the first and third electrowetting elements EW1, EW3. The electrowetting elements are tessellated such that the first side of each of the first and third electrowetting elements is aligned along a first wall axis WA1 substantially parallel, for example parallel within acceptable tolerances, to the first row axis. The first side of the second electrowetting element is aligned along a second wall axis WA2 spaced from the first wall axis by the display area of the second electrowetting element. In further examples, such as that of FIG. 6, the array comprises a second row of electrowetting elements located along a second row axis R2 and comprising a fourth, fifth and sixth electrowetting element EW4, EW5, EW6 respectively. The first side of each of the fourth and sixth electrowetting elements is aligned along the first wall axis WA1 and the first side of the fifth electrowetting element is aligned along a third wall axis WA3 spaced from the first wall axis WA1 by the display area of the fifth electrowetting element. This layout means that the first side of alternate electrowetting elements along a row axis alternates between being aligned with the first and the second wall axes WA1, WA2. This enables better resolution of horizontal display effects across multiple electrowetting elements, as the vertical height can be more finely controlled in dependence on the position of the first fluid.

In examples, the color filter of the first, second and third electrowetting elements is a red, green and blue color filter respectively. The red, green and blue colors referred to are for example each a predetermined hue which together can be used to form full color display effects, for example where the first, second and third electrowetting elements each is a sub-pixel and together form a pixel of the array. In further examples, such as that of FIG. 6, the color filter of the fourth, fifth and sixth electrowetting elements is a blue, green and red color filter respectively, with the first and fourth electrowetting elements located on a first column axis C1, the second and fifth electrowetting element located on a second column axis C2, and the third and sixth electrowetting element located on a third column axis C3. Hence, an array capable of full color display effects with a high sub-pixel resolution may be provided. By aligning the electrowetting elements with the green color filters along a column axis, for example the second and fifth electrowetting elements along the second column axis C2, a brighter white vertical display effect across multiple electrowetting elements may be provided, as green has a greater luminance than for example red or blue.

Figure 7:
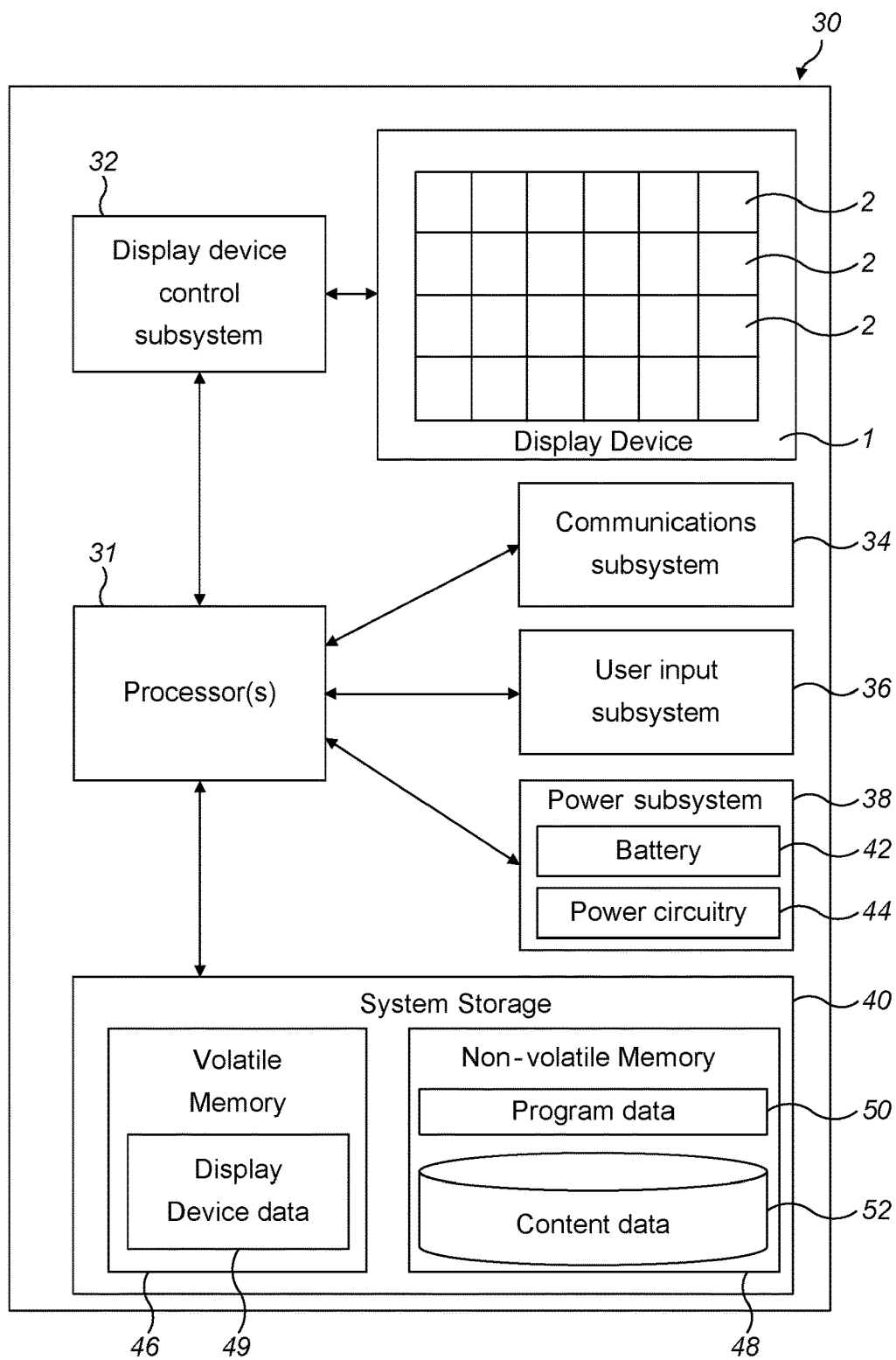
FIG. 7 shows a schematic system diagram of an example apparatus comprising an electrowetting display device.

FIG. 7 shows schematically a system diagram of an example system, for example electrowetting display apparatus 30, comprising an electrowetting display device such as any of the examples described above, for example the electrowetting display device 1 described above comprising electrowetting elements 2. The apparatus is for example a portable, for example mobile, device such as an electronic reader device such as a so-called e-reader, a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 30. The apparatus includes at least one processor 31 connected to and therefore in data communication with for example: a display device control subsystem 32, a communications subsystem 34, a user input subsystem 36, a power subsystem 38 and system storage 40. The display device control subsystem is connected to and is therefore in data communication with the display device 1. The at least one processor 31 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 40. The at least one processor may additionally, or in the alternative, contain memory, such as processor registers.

The display device control subsystem 32 for example includes electrowetting element driver components, for use in applying a voltage to any of the electrowetting elements, to address different such electrowetting elements. In examples the electrowetting elements are configured according to an active matrix configuration and the display device control subsystem is configured to control switching elements such as thin film transistors (TFTs) of the display device 1 via circuitry to control the electrowetting elements. The circuitry may include signal and control lines such as those described above.

The communications subsystem 34 for example is configured for the apparatus to communicate with for example a computing device via a data network, for example a computer network such as the Internet, a local area network, a wide area network, a telecommunications network, a wired network, a wireless network, or some other type of network. The communications subsystem 34 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 36 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 38 for example includes power circuitry 44 for use in transferring and controlling power consumed by the apparatus. The power may be provided by a mains electricity supply or from a battery 42, via the power circuitry. The power circuitry may further be used for charging the battery from a mains electricity supply.

The system storage 40 includes at least one memory, for example at least one of volatile memory 46 and non-volatile memory 48 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 7, the volatile memory 46 stores for example display device data 49 which is indicative of display effects to be provided by the display device 1. The processor 31 may transmit data, based on the display device data, to the display device control subsystem 32 which in turn outputs signals to the display device for applying voltages to the electrowetting elements, for providing display effects from the display device. The non-volatile memory 48 stores for example program data 50 and/or content data 52. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
a first volume of a first fluid;
a second fluid immiscible with the first fluid;
a support plate comprising:
  a wall comprising:
    a first wall portion at a first side of the electrowetting element,
    a second wall portion, and
    a third wall portion, the first wall portion joining the second wall portion and the third wall portion, the second wall portion joining the first wall portion and the third wall portion, and the third wall portion joining the first wall portion and the second wall portion,
  the wall at least partly confining the first volume of the first fluid to the electrowetting element, the electrowetting element not comprising a second volume of the first fluid, the wall at least partly confining the second volume of the first fluid to an adjacent electrowetting element,
a surface having a display area which is substanially triangular, the wall at least partly bounding a perimeter of the display area, a part of the display area adjoined by the first volume of the first fluid, the display area widening towards the first side of the electrowetting element, and
an electrode, the first volume of the first fluid and the second fluid switchable between at least:
  a first configuration with a zero voltage applied between the electrode and the second fluid, the first volume of the first fluid having a first shape, and
  a second configuration with a non-zero voltage applied between the electrode and the second fluid, the first volume of the first fluid having a second shape different from the first shape;
a color filter substantially overlapping a first sub-area of the display area, the first sub-area at least partly adjoined by the first volume of the first fluid in the first configuration, the color filter comprising:
  a first color filter portion widening towards the first side of the electrowetting element, and
  a second color filter with a substanially uniform platform width, the second color filter portion adjoining the first color filter portion and located nearer the first side of the electowetting element than the first color filter portion, the first sub-area of the display area comprising a first apex of the display area;
a first substanially colorless region substanially overlapping a second sub-area of the display area, the first sub-area not overlapping the second sub-area, the first substanially colorless region widening towards the first side of the electrowetting element, the second sub-area comprising a second apex area of the display area, and the second sub-area at least partly adjoined by the first volume of the first fluid int the first configuration; and
a second substanitially colorless substantially overlapping a third sub-area of the display area comprising a third apex area of the display area,
the third sub-area not overlapping the first sub-area of the dipaly area and the second sub-area of the dispaly area, and the first sub-area of the dispaly area seperating the second sub-area of the display area and the third sub-area of the display area.

2. The electrowetting element according to claim 1, the display area comprising an initiation area spaced from the first side of the electrowetting element, the electrowetting element configured to, upon switching from the first configuration to the second configuration, initiate movement of the first volume of the first fluid from the initiation area towards the first side of the electrowetting element.

3. The electrowetting element according to claim 1, the display area comprising an initiation area located at an apex of the display area between the second wall portion and the third wall portion, the electrowetting element configured to, upon switching from the first configuration to the second configuration, initiate movement of the first volume of the first fluid from the initiation area towards the first side of the electrowetting element.

4. The electrowetting element according to claim 1, wherein the second substantially colorless region widens towards the first side of the electrowetting element.

5. The electrowetting element according to claim 1, wherein
the color filter comprises a color filter material configured to filter out light of at least one wavelength, and
the first substanially colorless region comprises a transmissive material which transmits light of the at least one wavelength.

6. The electrowetting element according to claim 1, further comprising a planar layer, comprising:
a first planar layer portion comprising at least part of the color filter; and
a second planar layer portion comprising at least part of the first substantially colorless region.

7. An apparatus, comprising:
a support plate having a surface;
an array of electrowetting elements, each respective electrowetting element of the array of electrowetting elements comprising:
  a first volume of a first fluid,
  a second fluid immiscible with the first fluid,
  a wall of the support plate, the wall comprisisng:
    a first wall portion at a first side of the electrowetting element,
    a second wall portion, and
    a third wall portion, the frist wall portion joining the second wall portion and the third wall portion, the second wall portion joining the first wall portion and the third wall portion, and the third wall portion joining the first wall portion and the second wall portion,
  the wall at least partly confining the first volume of the first fluid to the respective electrowetting element, the respective electrowetting element not comprising a second volume of the first fluid, the wall at least partly confining the second volume of the first fluid to an adjacent electrowetting element,
  a display area of the surface, which display area is substaintially trangular, the wall at least bounding a perimeter of the display area, a part of the display area adjoined by the first volume of the first fluid, and the display area widening towards a first side of the electrowetting element,
  an electrode of the support plate, the first volume of the first fluid and the second fluid switchable between at least:
    a first configuration with a zero voltage applied between the electrode and the second fluid, the first volume of the first fluid having a first shape, and
    a second configuration with a non-zero voltage applied between the electrode and the second fluid, the first volume of the first fluid having a second shape different from the first shape;
  a color filter substantially overlapping a first sub-area of the display area, the first sub-area at least partly adjoined by the first volume of the first fluid in the first configuration, the color filter comprising:
    a first color filter portion widening towards the first side of the electrowetting element, and
    a second color filter portion with substantially uniform width, the second color filter portion adjoining the first color filter portion and located nearer the first side of the electrowetting element than the first color filter portion, the first sub-area of the display area comprising a first apex area of the dipsly area;
  a first substantially colorless region substantially overlapping a second sub-area of the display area, the first sub-area not overlapping the second sub-area, the first substantially colorless region widening towards the first side of the electrowetting element, the second sub-area comprising a second apex area of the display area, and the second sub-area at least partly adjoined by the first volume of the first fluid in the first configuration; and a second susbstainally colorless region substainally overlapping a third sub-area of the display area comprising a third apex area of the display area, the third sub-area not overlapping the first sub-area of the display area and the second sub-area of the dispaly area, and the first sub-area of the display area seperating the second sub-area of the display area and the third sub-area of the display area;

at least one processor; and at least one memory comprising computer program instructions, the at least one memory and the computer program instructions being configured to, with the at least one processor, control configuration of the first volume of the first fluid for each respective electrowetting element of the array of electrowetting elements.

8. The apparatus according to claim 7, wherein the wall of each respective electrowetting element of the array of electrowetting elements is substantially triangular and the array of electrowetting elements comprises a tessellated array of the electrowetting elements, a first row of the array of the electrowetting elements located along a first row axis and comprising:
 a first electrowetting element of the array of electrowetting elements,
 a second electrowetting element of the array of electrowetting elements, and
 a third electrowetting element of the array of electrowetting element, the second electrowetting element located between and adjacent to the first electrowetting element and the third electrowetting element, the first side of the first electrowetting element and the first side of the third electrowetting element aligned along a first wall axis substantially parallel to the first row axis, and the first side of the second electrowetting element aligned along a second wall axis spaced from the first row axis by the display area of the second electrowetting element.

9. The apparatus according to claim 8, wherein
the color filter of the first electrowetting element is a red color filter,
the color filter of the second electrowetting element is a green color filter, and
the color filter of the third electrowetting element is a blue color filter.

10. The apparatus according to claim 8, wherein the tessellated array of the electrowetting elements comprises:
a second row of the array of the electrowetting elements located along a second row axis and comprising:
 a fourth electrowetting element of the array of electrowetting elements,
 a fifth electrowetting element of the array of electrowetting elements, and
 a sixth electrowetting element of the array of electrowetting elements, the fifth electrowetting element located between and adjacent to the fourth electrowetting element and the sixth electrowetting element, the first side of the fourth electrowetting element and the first side of the sixth electrowetting element aligned along the first wall axis, and the first side of the fifth electrowetting element aligned along a third wall axis spaced from the first row axis by the display area of the fifth electrowetting element.

11. The apparatus according to claim 10, wherein:
the color filter of the first electrowetting element is a red color filter,
the color filter of the second electrowetting element is a green color filter,
the color filter of the third electrowetting element is a blue color filter,
the color filter of the fourth electrowetting element is a blue color filter,
the color filter of the fifth electrowetting element is a green color filter, and
the color filter of the sixth electrowetting element is a red color filter; and
the first electrowetting element and the fourth electrowetting element are located on a first column axis,
the second electrowetting element and the fifth electrowetting element are located on a second column axis, and
the third electrowetting element and the sixth electrowetting element are located on a third column axis.

12. The apparatus according to claim 7, wherein for each respective electrowetting element of the array of electrowetting elements, the display area of the respective electrowetting element comprises an initiation area spaced from the first side of the respective electrowetting element, and the respective electrowetting element is configured to, upon switching from the first configuration to the second configuration, initiate movement of the first fluid from the initiation area towards the first side of the respective electrowetting element.

13. The apparatus according to claim 7, wherein the second substantially colorless region widens towards the first side of the electrowetting element.

* * * * *

UNITED STATES PATENT AND TRADEMARK OFFICE
CERTIFICATE OF CORRECTION

PATENT NO. : 10,067,335 B1
APPLICATION NO. : 14/980587
DATED : September 4, 2018
INVENTOR(S) : De Greef et al.

Page 1 of 2

It is certified that error appears in the above-identified patent and that said Letters Patent is hereby corrected as shown below:

In the Claims

In Column 21, Line 4, in Claim 1, delete "substanially" and insert -- substantially --, therefor.

In Column 21, Lines 27-28, in Claim 1, delete "a second color filter with a substanially uniform platform width," and insert -- a second color filter portion with a substantially uniform width, --, therefor.

In Column 21, Line 30, in Claim 1, delete "electowetting" and insert -- electrowetting --, therefor.

In Column 21, Line 32, in Claim 1, delete "apex of" and insert -- apex area of --, therefor.

In Column 21, Line 33, in Claim 1, delete "a first substanially colorless region substanially" and insert -- a first substantially colorless region substantially --, therefor.

In Column 21, Line 40, in Claim 1, delete "int" and insert -- in --, therefor.

In Column 21, Line 42, in Claim 1, delete "a second substanitially colorless substantially" and insert -- a second substantially colorless region substantially --, therefor.

In Column 21, Line 46, in Claim 1, delete "dipaly area and the second sub-area of the dispaly area," and insert -- display area and the second sub-area of the display area, --, therefor.

In Column 21, Line 47, in Claim 1, delete "dispaly area seperating" and insert -- display area separating --, therefor.

In Column 22, Line 5, in Claim 5, delete "substanially" and insert -- substantially --, therefor.

In Column 22, Line 21, in Claim 7, delete "comprisisng:" and insert -- comprising: --, therefor.

Signed and Sealed this
Twenty-third Day of April, 2019

Andrei Iancu
*Director of the United States Patent and Trademark Office*

CERTIFICATE OF CORRECTION (continued)
U.S. Pat. No. 10,067,335 B1

In Column 22, Line 25, in Claim 7, delete "frist" and insert -- first --, therefor.

In Column 22, Line 38, in Claim 7, delete "substantially trangular," and insert -- substantially triangular, --, therefor.

In Column 22, Line 60, in Claim 7, delete "with substantially" and insert -- with a substantially --, therefor.

In Column 22, Line 65, in Claim 7, delete "dipsly" and insert -- display --, therefor.

In Column 23, Line 8, in Claim 7, delete "a second susbstainally colorless region substainally" and insert -- a second substantially colorless region substantially --, therefor.

In Column 23, Line 14, in Claim 7, delete "dispaly" and insert -- display --, therefor.

In Column 23, Line 15, in Claim 7, delete "seperating" and insert -- separating --, therefor.